United States Patent
Nishihara et al.

(10) Patent No.: US 6,522,902 B2
(45) Date of Patent: *Feb. 18, 2003

(54) APPARATUS FOR SAVING POWER CONSUMPTION OF A PORTABLE ELECTRONIC DEVICE

(75) Inventors: Toshiyuki Nishihara, Tokyo (JP); Susumu Uriya, Tokyo (JP); Masahiro Fujii, Tokyo (JP)

(73) Assignee: NEC Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/019,589

(22) Filed: Feb. 6, 1998

(65) Prior Publication Data

US 2001/0012794 A1 Aug. 9, 2001

(30) Foreign Application Priority Data

Feb. 10, 1997 (JP) .............................. 9-025701

(51) Int. Cl.$^7$ ............................... H04B 1/38
(52) U.S. Cl. ................ 455/574; 455/127; 455/343; 320/117
(58) Field of Search ............... 455/572, 573, 455/574, 575, 127, 128, 349, 343, 351; 320/117, 166; 607/16

(56) References Cited

U.S. PATENT DOCUMENTS

| 3,855,534 A | * 12/1974 | Holcomb et al. ........... 455/439 |
| 4,365,290 A | * 12/1982 | Nelms et al. ............... 607/16 X |
| 4,540,929 A | 9/1985 | Binkley ........................ 320/104 |
| 5,121,046 A | * 6/1992 | McCollough ............... 320/117 |
| 5,369,351 A | 11/1994 | Adams ......................... 320/121 |
| 5,552,692 A | * 9/1996 | McKillop ...................... 320/9 |
| 5,773,959 A | * 6/1998 | Merritt et al. ............. 320/117 X |
| 5,808,444 A | * 9/1998 | Saeki et al. ................. 320/117 |

FOREIGN PATENT DOCUMENTS

| GB | 1 583 865 | 2/1981 |
| JP | 63-154774 | 10/1988 |

(List continued on next page.)

OTHER PUBLICATIONS

Japanese Office Action, dated Aug. 24, 1999, with English language translation of Japanese Examiner's comments.
United Kingdom Office Action, dated May 11, 2001.

Primary Examiner—William Trost
Assistant Examiner—Philip J. Sobutka
(74) Attorney, Agent, or Firm—Whitham, Curtis & Christofferson, P.C.

(57) ABSTRACT

A battery pack for containing a plurality of cells and being attached to an electronic device comprises a plurality of switches for switching connection status of the cells between parallel connection and series connection. In the case of a battery pack containing a first cell and a second cell, the battery pack comprises a first wire for connecting the positive pole of the first cell and the positive pole of the second cell, a second wire for connecting the negative pole of the first cell and the negative pole of the second cell, a third wire for connecting the negative pole of the first cell and the positive pole of the second cell, a first switch for connecting/disconnecting the first wire, a second switch for connecting/disconnecting the second wire, and a third switch for connecting/disconnecting the third wire. The cells are connected in series when high voltage is needed, and in parallel otherwise. According to the battery pack, wastage of power consumption is reduced and continuous use time length of electronic devices such as portable telephones, portable data communication devices, etc. can be extended.

8 Claims, 6 Drawing Sheets

FOREIGN PATENT DOCUMENTS

| | | |
|---|---|---|
| JP | 2-12531 | 1/1990 |
| JP | 2-121531 | 5/1990 |
| JP | 5336604 | 12/1993 |
| JP | 6-197458 | 7/1994 |
| JP | 6-311080 | 11/1994 |
| JP | 6-327163 | 11/1994 |
| JP | 7-143684 | 6/1995 |
| JP | 7-273715 | 10/1995 |
| JP | 8-33216 | 2/1996 |

* cited by examiner

APPARATUS FOR SAVING POWER CONSUMPTION OF A PORTABLE ELECTRONIC DEVICE

BACKGROUND OF THE INVENTION

The present invention relates to a portable electronic device and a battery pack, and in particular, to a portable electronic device and a battery pack by which power consumption of cells used therein can be reduced.

DESCRIPTION OF THE RELATED ART

Various kinds of portable electronic devices such as portable telephones, portable televisions, portable personal computers, etc. are put on the market. Such portable electronic devices are powered by internal batteries or battery packs which include batteries. In the following, a case of a conventional portable telephone will be described as an example of a portable electronic device, referring to FIG. 1.

Figure 1:
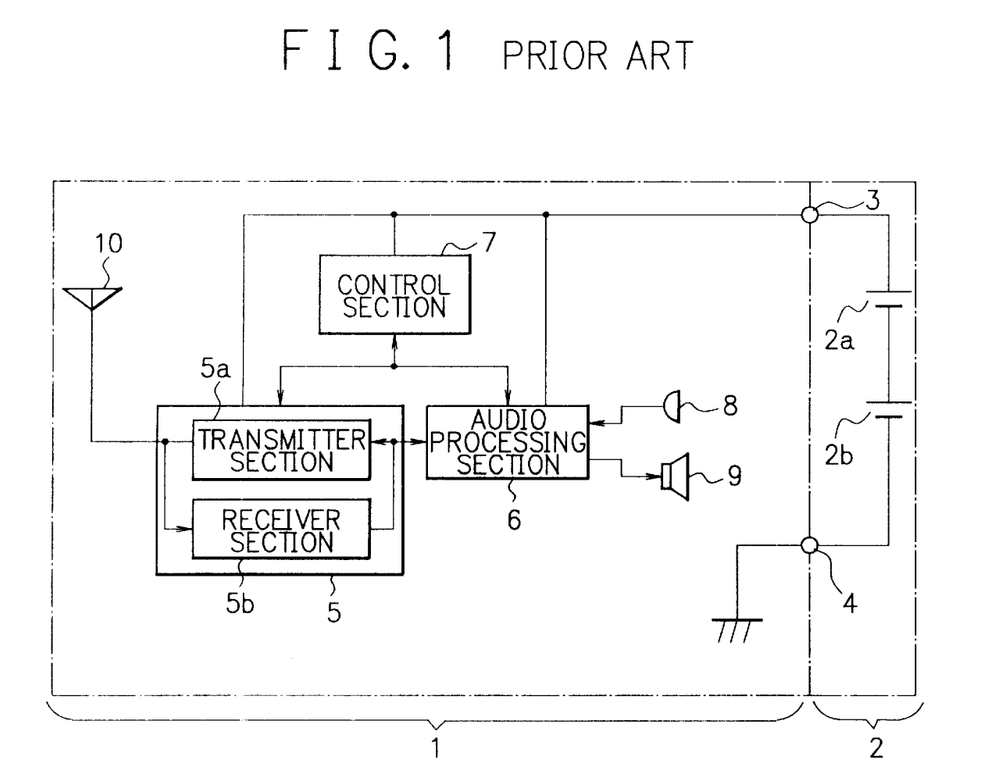
FIG. 1 is a block diagram showing a conventional portable electronic device.

As shown in FIG. 1, the conventional portable telephone 1 is powered by a battery pack 2 which includes rechargeable battery cells 2a and 2b, and the battery pack 2 is connected to the portable telephone 1 via feeding terminals 3 and 4.

The portable telephone 1 comprises a radio section 5, an audio processing section 6, a control section 7, a microphone 8, a speaker 9, and an antenna 10.

Circuit blocks such as the radio section 5, the audio processing section 6 and the control section 7 are connected to the feeding terminal 3, and each of them is grounded though unshown, that is, each such circuit block is powered by the battery pack 2. The radio section 5 includes a transmitter section 5a provided with an output amplification circuit, and a receiver section 5b for receiving radio signals from radio base stations. The transmitter section 5a generates a transmitter signal to be transmitted to the radio. base stations, which is a signal with a higher power compared to other signals inside the portable telephone 1. Therefore, the transmitter section 5a needs supply of more power and higher voltage than those needed by other circuit blocks such as the receiver section 5b, the control section 7, etc. In this sense, the transmitter section 5a is a voltage type circuit. Meanwhile, the other circuit blocks such as the receiver section 5b, the control section 7, etc. do not need such high voltages as needed by the transmitter section 5a, since their output signal levels are not large and lower voltage levels for supplying currents of predetermined levels are only necessary. In this sense, the circuit blocks such as the receiver section 5b, the control section 7, etc. are current type circuits.

The battery pack 2 is composed of a plurality of rechargeable battery cells connected in series between the positive pole feeding terminal 3 and the negative pole feeding terminal 4. In the conventional example of FIG. 1, two rechargeable battery cells 2a and 2b are connected in series, and the rechargeable battery cells 2a and 2b supply voltages which are necessary for operations of the circuit blocks in the portable telephone 1 such as the radio section 5, the audio processing section 6, the control section 7, etc.

In such conventional portable telephones as shown above, the output voltage level of the battery pack 2 (i.e. the number of the rechargeable battery cells which are connected in series) is decided according to a voltage level which is necessary for the operation of the portable telephone 1, especially according to a voltage level which is needed by a circuit block which needs the highest voltage. As mentioned above, the transmitter section 5a in the radio section 5 needs the largest power and the highest voltage in the portable telephone 1, for generating the transmitter signal for being transmitted to the radio base stations. Therefore, in the design of the conventional portable telephones, the output voltage level of the battery pack 2 is decided according to the voltage level which is needed by the transmitter section 5a.

While a telephone call is in progress (i.e. during the talk time), the portable telephone 1 executes transmitting and receiving at the same time. Therefore, the voltage level which is needed by the transmitter section 5a has to be supplied during the talk time. Meanwhile, when the portable telephone 1 is waiting for reception of calling (i.e. during the standby time), the portable telephone 1 executes only receiving, that is, only the receiver section 5b works while the transmitter section 5a is in a state of not working or working at intervals. In such a state where the transmitter section 5a is not working, supply of a lower voltage level which is needed by the other circuit blocks than the transmitter section 5a (such as the receiver section 5b, the control section 7, etc.) is enough for the operation of the portable telephone 1.

However, in conventional portable electronic devices, it is impossible to change or switch the output voltage level of the battery pack according to the operating status of the portable electronic device. In the case of the conventional portable telephone for example, a high voltage which is needed only during the talk time is constantly supplied to each circuit block in the portable telephone 1 even during the standby time, causing power consumption due to the difference between the voltage needed during the talk time and the voltage needed during the standby time.

Generally, the length of the standby time is much longer than the length of the talk time. Therefore, the length of the continuous use time of the portable telephone (i.e. the time between charges of the battery pack) is largely dependent on the power consumption during the standby time, and thus reducing the power consumption during the standby time is greatly effective for extension of the continuous use time length.

SUMMARY OF THE INVENTION

It is therefore the primary object of the present invention to provide a portable electronic device by which power consumption is reduced and the continuous use time length of the portable electronic device can be extended.

Another object of the present invention is to provide a battery pack by which power consumption is reduced and the continuous use time length of portable electronic devices in which the battery pack is installed can be extended.

In accordance with a first aspect of the present invention, there is provided a battery pack for containing a plurality of cells which comprises a plurality of switches for switching connection status of the cells between parallel connection and series connection.

In accordance with a second aspect of the present invention, in the first aspect, the battery pack contains a first cell and a second cell, and the battery pack comprises a first wire for connecting the positive pole of the first cell and the positive pole of the second cell, a second wire for connecting the negative pole of the first cell and the negative pole of the second cell, a third wire for connecting the negative pole of the first cell and the positive pole of the second cell, a first switch for connecting/disconnecting the first wire, a second switch for connecting/disconnecting the second wire, and a third switch for connecting/disconnecting the third wire.

In accordance with a third aspect of the present invention, in the second aspect, the battery pack further comprises a fourth wire for connecting the negative pole of the second cell and a negative pole feeding terminal of the battery pack, and a fourth switch for connecting/disconnecting the fourth wire.

In accordance with a fourth aspect of the present invention, in the third aspect, the battery pack further comprises a fifth wire for connecting the negative pole of the first cell and the negative pole feeding terminal of the battery pack, and a fifth switch for connecting/disconnecting the fifth wire, in which both of the fourth switch and the fifth switch are closed when the first cell and the second cell are connected in parallel.

In accordance with a fifth aspect of the present invention, in the second aspect, the first switch and the second switch are switched from open states to close states after the third switch is switched from a close state to an open state when the connection status of the cells is switched from series connection to parallel connection, and the third switch is switched from an open state to a close state after the first switch and the second switch are switched from close states to open states when the connection status of the cells is switched from parallel connection to series connection.

In accordance with a sixth aspect of the present invention, in the fifth aspect, the battery pack further comprises a capacitor for storing electric charge supplied from the first and the second cells and preventing interruption of voltage supply to an electronic device to which the battery pack is attached during the switching of the connection status of the first and the second cells between parallel connection and series connection.

In accordance with a seventh aspect of the present invention, in the second aspect, the battery pack further comprises a control means for controlling the connection status of the cells according to a control signal sent from a portable electronic device to which the battery pack is attached. The control means sets the connection status of the cells in a first status in which the first switch and the second switch are in open states and the third switch is in a close state so that the first cell and the second cell will be connected in series, when the control signal represents an operating status of the portable electronic device in which high voltage is needed. And the control means sets the connection status of the cells in a second status in which the first switch and the second switch are in close states and the third switch is in an open state so that the first cell and the second cell will be connected in parallel, when the control signal represents an operating status of the portable electronic device in which high voltage is not needed.

In accordance with an eighth aspect of the present invention, in the second aspect, the battery pack further comprises a control means for controlling the connection status of the cells according to a control signal which is sent from a portable communication device to which the battery pack is attached. The control means sets the connection status of the cells in a first status in which the first switch and the second switch are in open states and the third switch is in a close state so that the first cell and the second cell will be connected in series, when the control signal represents an operating status of the portable communication device in which communication is needed to be executed. And the control means sets the connection status of the cells in a second status in which the first switch and the second switch are in close states and the third switch is in an open state so that the first cell and the second cell will be connected in parallel, when the control signal represents an operating status of the portable communication device in which communication is not needed to be executed.

In accordance with a ninth aspect of the present invention, in the second aspect, the battery pack further comprises a control means for controlling the connection status of the cells according to a control signal which is sent from a portable communication device to which the battery pack is attached, a first positive pole feeding terminal for supplying voltage to a transmitter section of the portable communication device, a second positive pole feeding terminal for supplying voltage to circuit blocks of the portable communication device other than the transmitter section, a sixth wire for connecting the first positive pole feeding terminal and the positive pole of the first cell, a sixth switch for connecting/disconnecting the sixth wire, and a seventh wire for connecting the second positive pole feeding terminal and the positive pole of the second cell and supplying voltage to the circuit blocks other than the transmitter section constantly. The control means sets the connection status of the cells in a first status in which the first switch and the second switch are in open states and the third switch and the sixth switch are in close states so that the first cell and the second cell will be connected in series and the transmitter section will be supplied with voltage by the series connection of the first cell and the second cell, when the control signal represents an operating status of the portable communication device in which communication by the transmitter section is needed to be executed. And the control means sets the connection status of the cells in a second status in which the first switch and the second switch are in close states and the third switch and the sixth switch are in open states so that the first cell and the second cell will be connected in parallel and the transmitter section will not be supplied with voltage by the first cell and the second cell, when the control signal represents an operating status of the portable communication device in which communication by the transmitter section is not needed to be executed.

In accordance with a tenth aspect of the present invention, in the eighth aspect, the first switch and the second switch are switched from open states to close states after the third switch is switched from a close state to an open state, when the connection status of the cells is switched from series connection to parallel connection. And the third switch is switched from an open state to a close state after the first switch and the second switch are switched from close states to open states, when the connection status of the cells is switched from parallel connection to series connection. And the battery pack further comprises a capacitor for storing electric charge supplied from the first and the second cells and preventing interruption of voltage supply to the portable communication device during the switching of the connection status of the first and the second cells between parallel connection and series connection.

In accordance with an eleventh aspect of the present invention, in the tenth aspect, the control signal includes a communication start signal which represents a status in which the portable communication device is going to start communication, and a standby signal which represents a status in which the portable communication device is in the standby time, and the control means switches the connection status of the cells to the first status before the communication is started, according to the communication start signal, and switches the connection status of the cells to the second status after the communication is stopped, according to the standby signal.

In accordance with a twelfth aspect of the present invention, in the eleventh aspect, the switching of the connection status of the cells by the control means is executed during time slots which are not sent to the portable communication device in the case where the portable communication device to which the battery pack is attached is a device which executes time division communication.

In accordance with a thirteenth aspect of the present invention, in the third aspect, the battery pack further comprises a voltage measurement means for measuring voltage level of the cells. The fourth switch is opened when the measured voltage level is lower than a predetermined voltage level in order to prevent overdischarge of the cells.

In accordance with a fourteenth aspect of the present invention, in the second aspect, the battery pack further comprises a positive pole recharge terminal connected with the positive pole of the first cell, and a negative pole recharge terminal connected with the negative pole of the second cell.

In accordance with a fifteenth aspect of the present invention, in the fourteenth aspect, the first cell and the second cell are connected in series when a charger is connected to the recharge terminals and recharge of the cells is executed.

In accordance with a sixteenth aspect of the present invention, in the fifteenth aspect, the battery pack further comprises a voltage measurement means for measuring recharge voltage level of the cells. Recharge circuit is opened when the measured recharge voltage level is higher than a predetermined voltage level in order to prevent overcharge of the cells.

In accordance with a seventeenth aspect of the present invention, there is provided a portable electronic device containing a plurality of cells. The portable electronic device comprises a plurality of switches for switching connection status of the cells between parallel connection and series connection.

In accordance with an eighteenth aspect of the present invention, in the seventeenth aspect, the portable electronic device contains a first cell and a second cell, and the portable electronic device comprises a first wire for connecting the positive pole of the first cell and the positive pole of the second cell, a second wire for connecting the negative pole of the first cell and the negative pole of the second cell, a third wire for connecting the negative pole of the first cell and the positive pole of the second cell, a first switch for connecting/disconnecting the first wire, a second switch for connecting/disconnecting the second wire, and a third switch for connecting/disconnecting the third wire.

In accordance with a nineteenth aspect of the present invention, in the eighteenth aspect, the portable electronic device further comprises a fourth wire for connecting the negative pole of the second cell and a ground terminal of the portable electronic device, and a fourth switch for connecting/disconnecting the fourth wire.

In accordance with a twentieth aspect of the present invention, in the nineteenth aspect, the portable electronic device further comprises a fifth wire for connecting the negative pole of the first cell and the ground terminal of the portable electronic device, and a fifth switch for connecting/disconnecting the fifth wire. Both of the fourth switch and the fifth switch are closed when the first cell and the second cell are connected in parallel.

In accordance with a twenty-first aspect of the present invention, in the eighteenth aspect, the first switch and the second switch are switched from open states to close states after the third switch is switched from a close state to an open state, when the connection status of the cells is switched from series connection to parallel connection. And the third switch is switched from an open state to a close state after the first switch and the second switch are switched from close states to open states, when the connection status of the cells is switched from parallel connection to series connection.

In accordance with a twenty-second aspect of the present invention, in the twenty-first aspect, the portable electronic device further comprises a capacitor for storing electric charge supplied from the first and the second cells and preventing interruption of voltage supply during the switching of the connection status of the first and the second cells between parallel connection and series connection.

In accordance with a twenty-third aspect of the present invention, in the eighteenth aspect, the portable electronic device further comprises a control means for controlling the connection status of the cells according to a control signal which is generated for representing the operating status of the portable electronic device. The control means sets the connection status of the cells in a first status in which the first switch and the second switch are in open states and the third switch is in a close state so that the first cell and the second cell will be connected in series, when the control signal represents an operating status of the portable electronic device in which high voltage is needed. And the control means sets the connection status of the cells in a second status in which the first switch and the second switch are in close states and the third switch is in an open state so that the first cell and the second cell will be connected in parallel, when the control signal represents an operating status of the portable electronic device in which high voltage is not needed.

In accordance with a twenty-fourth aspect of the present invention, in the eighteenth aspect, the portable electronic device further comprises a transmitter section for executing transmission, and a control means for controlling the connection status of the cells according to a control signal which is generated for representing the operating status of the portable electronic device. The control means sets the connection status of the cells in a first status in which the first switch and the second switch are in open states and the third switch is in a close state so that the first cell and the second cell will be connected in series, when the control signal represents an operating status in which communication by the transmitter section is needed to be executed. And the control means sets the connection status of the cells in a second status in which the first switch and the second switch are in close states and the third switch is in an open state so that the first cell and the second cell will be connected in parallel, when the control signal represents an operating status in which communication by the transmitter section is not needed to be executed.

In accordance with a twenty-fifth aspect of the present invention, in the eighteenth aspect, the portable electronic device further comprises a transmitter section for executing transmission, a control means for controlling the connection status of the cells according to a control signal which is generated for representing the operating status of the portable electronic device, a first positive pole feeding terminal for supplying voltage to the transmitter section, a second positive pole feeding terminal for supplying voltage to circuit blocks of the portable electronic device other than the transmitter section, a sixth wire for connecting the first positive pole feeding terminal and the positive pole of the first cell, a sixth switch for connecting/disconnecting the sixth wire, and a seventh wire for connecting the second positive pole feeding terminal and the positive pole of the second cell and supplying voltage to the circuit blocks other than the transmitter section constantly. The control means sets the connection status of the cells in a first status in which the first switch and the second switch are in open states and the third switch and the sixth switch are in close states so that the first cell and the second cell will be connected in series and the transmitter section will be supplied with voltage by the series connection of the first cell and the second cell, when the control signal represents an operating status in which communication by the transmitter section is needed to be executed. And the control means sets the connection status of the cells in a second status in which the first switch and the second switch are in close states and the third switch and the sixth switch are in open states so that the first cell and the second cell will be connected in parallel and the transmitter section will not be supplied with voltage by the first cell and the second cell, when the control signal represents an operating status in which communication by the transmitter section is not needed to be executed.

In accordance with a twenty-sixth aspect of the present invention, in the twenty-fourth aspect, the first switch and the second switch are switched from open states to close states after the third switch is switched from a close state to an open state, when the connection status of the cells is switched from series connection to parallel connection. And the third switch is switched from an open state to a close state after the first switch and the second switch are switched from close states to open states, when the connection status of the cells is switched from parallel connection to series connection. And the portable electronic device further comprises a capacitor for storing electric charge supplied from the first and the second cells and preventing interruption of voltage supply during the switching of the connection status of the first and the second cells between parallel connection and series connection.

In accordance with a twenty-seventh aspect of the present invention, in the twenty-sixth aspect, the control signal includes a communication start signal which represents a status in which the portable electronic device is going to start communication, and a standby signal which represents a status in which the portable electronic device is in the standby time. The control means switches the connection status of the cells to the first status before the communication is started, according to the communication start signal, and switches the connection status of the cells to the second status after the communication is stopped, according to the standby signal.

In accordance with a twenty-eighth aspect of the present invention, in the twenty-seventh aspect, the portable electronic device is a portable communication device which executes time division communication, and the switching of the connection status of the cells by the control means is executed during time slots which are not sent to the portable electronic device itself.

In accordance with a twenty-ninth aspect of the present invention, in the nineteenth aspect, the portable electronic device further comprises a voltage measurement means for measuring voltage level of the cells. The fourth switch is opened when the measured voltage level is lower than a predetermined voltage level in order to prevent overdischarge of the cells.

In accordance with a thirtieth aspect of the present invention, in the eighteenth aspect, the portable electronic device further comprises a positive pole recharge terminal connected with the positive pole of the first cell, and a negative pole recharge terminal connected with the negative pole of the second cell.

In accordance with a thirty-first aspect of the present invention, in the thirtieth aspect, the first cell and the second cell are connected in series when a charger is connected to the recharge terminals and recharge of the cells is executed.

In accordance with a thirty-second aspect of the present invention, in the thirty-first aspect, the portable electronic device further comprises a voltage measurement means for measuring recharge voltage level of the cells. Recharge circuit is opened when the measured recharge voltage level is higher than a predetermined voltage level in order to prevent overcharge of the cells.

BRIEF DESCRIPTION OF THE DRAWINGS

The objects and features of the present invention will become more apparent from the consideration of the following detailed description taken in conjunction with the accompanying drawings, in which.

DESCRIPTION OF THE PREFERRED EMBODIMENTS

Referring now to the drawings, a description will be given in detail of preferred embodiments in accordance with the present invention.

Figure 2:
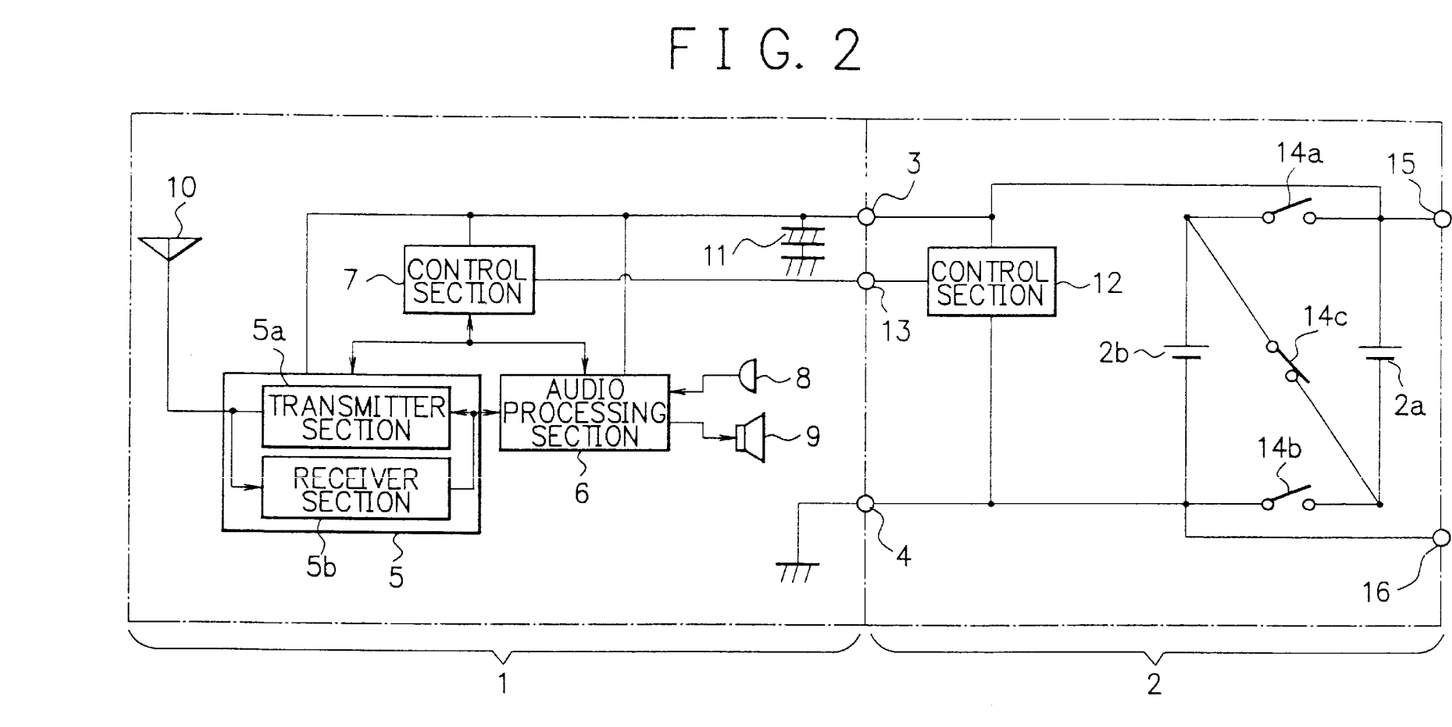
FIG. 2 is a block diagram showing an embodiment of the present invention.

FIG. 2 is a block diagram showing an embodiment of the present invention, in which a battery pack 2 according to the present invention is attached to a portable telephone 1. Incidentally, in FIG. 2, the same reference characters as those of FIG. 1 designate the same or corresponding parts to those of FIG. 1.

In the embodiment of FIG. 2, the battery pack 2 is connected to the portable telephone 1 via feeding terminals 3 and 4 and a control signal terminal 13, and the portable telephone 1 is powered by the battery pack 2 via the feeding terminals 3 and 4, and information of the portable telephone 1 is sent to the battery pack 2 via the control signal terminal 13.

The portable telephone 1 comprises a radio section 5, an audio processing section 6, a control section 7, a microphone 8, a speaker 9, and an antenna 10. The control section 7 of the portable telephone 1 is, for example, composed of a microprocessor unit including a CPU, ROM (Read Only Memory), RAM (Random Access Memory), etc.

Circuit blocks such as the radio section 5, the audio processing section 6 and the control section 7 are connected to the feeding terminal 3, and each of them is grounded though unshown, that is, each of such circuit blocks is powered by the battery pack 2. The radio section 5 includes a transmitter section 5a provided with an output amplification circuit, and a receiver section 5b for receiving radio signals from radio base stations. A capacitor 11 of large capacitance is provided between the positive pole feeding terminal 3 and the negative pole feeding terminal 4. The control section 7 detects the operating status of the portable telephone 1 (for example, in the talk time or in the standby time), and sends the information to the control section 12 of the battery pack 2 via the control signal terminal 13. The control section 12 of the battery pack 2 is, for example, composed of a microprocessor unit including a CPU, ROM (Read Only Memory), RAM (Random Access Memory), etc.

The battery pack 2 is connected to the portable telephone 1 via the positive pole feeding terminal 3 and the negative pole feeding terminal 4. The battery pack 2 includes a first rechargeable battery cell 2a, a second rechargeable battery cell 2b, a first switch 14a, a second switch 14b, and a third switch 14c. Each of the switches 14a, 14b and 14c is placed to connect between the first rechargeable battery cell 2a and the second rechargeable battery cell 2b. The battery pack 2 is further provided with a positive pole recharge terminal 15 and a negative pole recharge terminal 16 for connecting the rechargeable battery cells 2a, 2b and a charger. The positive pole recharge terminal 15 is further connected to the positive pole feeding terminal 3, and the negative pole recharge terminal 16 is further connected to the negative pole feeding terminal 4. On-off of the switches 14a, 14b and 14c are controlled by the control section 12 of the battery pack 2. The switches 14a, 14b and 14c are generally composed of semiconductor switches such as MOSFETs.

The positive pole of the first rechargeable battery cell 2a is connected to the positive pole feeding terminal 3, and is connected with the positive pole of the second rechargeable battery cell 2b via the first switch 14a. The negative pole of the first rechargeable battery cell 2a is connected with the negative pole of the second rechargeable battery cell 2b via the second switch 14b, and is connected with the positive pole of the second rechargeable battery cell 2b via the third switch 14c. The negative pole of the second rechargeable battery cell 2b is connected to the negative pole feeding terminal 4, and is connected with the negative pole of the first rechargeable battery cell 2a via the second switch 14b as mentioned above.

The control section 12 of the battery pack 2 detects the operating status of the portable telephone 1 by a control signal which is sent from the control section 7 of the portable telephone 1 via the control signal terminal 13, and opens/closes the switches 14a, 14b and 14c according to the result of the detection. The control section 12 is also connected with the positive pole feeding terminal 3 (the positive pole recharge terminal 15) and the negative pole feeding terminal 4 (the negative pole recharge terminal 16), and the control section 12 is designed to monitor a supply voltage which is supplied to the portable telephone 1 and a recharge voltage which is supplied from the charger.

In the following, the operation of the embodiment will be described referring to FIG. 2 and Table 1.

TABLE 1

| | STATE 1 SERIES CONNECTION | STATE 2 PARALLEL CONNECTION | STATE 3 RECHARGE |
|---|---|---|---|
| FIRST SWITCH 14a | OPEN | CLOSE | OPEN |
| SECOND SWITCH 14b | OPEN | CLOSE | OPEN |

TABLE 1-continued

| | STATE 1 SERIES CONNECTION | STATE 2 PARALLEL CONNECTION | STATE 3 RECHARGE |
|---|---|---|---|
| THIRD SWITCH 14c | CLOSE | OPEN | CLOSE |

When the operating status of the portable telephone 1 is 'in the talk time' or 'starting the talk time', the control section 7 of the portable telephone 1 sends the operating status (i.e. the control signal which represents 'in the talk time' or 'starting the talk time') to the control section 12 of the battery pack 2 via the control signal terminal 13. Then, the control section 12 of the battery pack 2 controls on-off of the switches 14a, 14b and 14c so that the first rechargeable battery cell 2a and the second rechargeable battery cell 2b will be connected in series (the state 1 in Table 1), thus the supply voltage which is supplied from the battery pack 2 to the portable telephone 1 is set high.

On the other hand, when the operating status of the portable telephone 1 is 'in the standby time' or 'started the standby time', the control section 7 of the portable telephone 1 sends the operating status (i.e. the control signal which represents 'the standby time' to the control section 12 of the battery pack 2 via the control signal terminal 13. Then, the control section 12 of the battery pack 2 controls on-off of the switches 14a, 14b and 14c so that the first rechargeable battery cell 2a and the second rechargeable battery cell 2b will be connected in parallel (the state 2 in Table 1), thus the supply voltage which is supplied from the battery pack 2 to the portable telephone 1 is set low.

When the first rechargeable battery cell 2a and the second rechargeable battery cell 2b are connected in series, the first switch 14a and the second switch 14b are in open states and the third switch 14c is in a close state, as shown in the state 1 in Table 1. Thus, the positive pole feeding terminal 3 is connected to the positive pole of the first rechargeable battery cell 2a, and the negative pole of the first rechargeable battery cell 2a is connected with the positive pole of the second rechargeable battery cell 2b via the third switch 14c, and the negative pole of the second rechargeable battery cell 2b is connected to the negative pole feeding terminal 4. Therefore, the sum of the voltages of the two rechargeable battery cells 2a and 2b is applied between the positive pole feeding terminal 3 and the negative pole feeding terminal 4. Incidentally, the switches 14a, 14b and 14c in FIG. 2 are showing this state 1 of Table 1.

On the other hand, when the first rechargeable battery cell 2a and the second rechargeable battery cell 2b are connected in parallel, the first switch 14a and the second switch 14b are in close states and the third switch 14c is in an open state, as shown in the state 2 in Table 1. Thus, the positive poles of the first rechargeable battery cell 2a and the second rechargeable battery cell 2b are connected together via the first switch 14a, and the negative poles of the first rechargeable battery cell 2a and the second rechargeable battery cell 2b are connected together via the second switch 14b. Thus, the positive pole feeding terminal 3 is connected to the positive poles of the first rechargeable battery cell 2a and the second rechargeable battery cell 2b, and the negative pole feeding terminal 4 is connected to the negative poles of the first rechargeable battery cell 2a and the second rechargeable battery cell 2b. Therefore, the voltage of a piece of rechargeable battery cell is applied between the positive pole feeding terminal 3 and the negative pole feeding terminal 4.

Incidentally, although the portable telephone 1 was designed to be attached to the battery pack 2 including the rechargeable battery cells and the switches in this embodiment, it is as well possible to design the portable telephone 1 to directly include the rechargeable battery cells and the switches using no battery pack.

Further, although no constant-voltage circuit was provided between the positive pole feeding terminal 3 and each circuit block in this embodiment, it is as well possible to provide constant-voltage circuits between the positive pole feeding terminal 3 and the circuit blocks, and let the control section 7 switch the output voltages of some of the constant-voltage circuits according to the control of the switches 14a, 14b and 14c.

Figure 3:
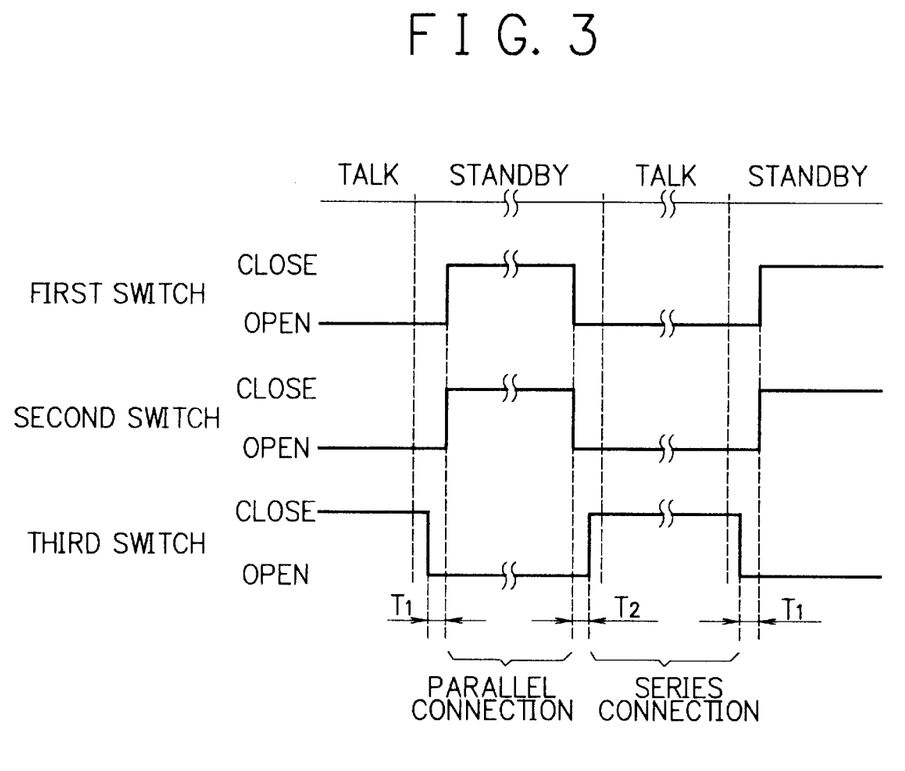
FIG. 3 is a timing chart showing the operation of switches of a battery pack in the embodiment of FIG. 2.

FIG. 3 is a timing chart showing the switching of the switches 14a, 14b and 14c in the battery pack 2. When a talk (i.e. a conversation using the portable telephone 1) ends and a standby starts, the connection status of the rechargeable battery cells 2a and 2b is switched from series connection to parallel connection. The control section 7 of the portable telephone 1 sends the control signal which represents the shift of the operating status into the standby time to the control section 12 of the battery pack 2. Then, the control section 12 of the battery pack 2 opens the third switch 14c first, and closes the first switch 14a and the second switch 14b after a time interval of T1.

On the other hand, when the standby ends and a talk starts, the connection status of the rechargeable battery cells 2a and 2b is switched from parallel connection to series connection. The control section 7 of the portable telephone 1 sends the control signal which represents the shift of the operating status into the talk time to the control section 12 of the battery pack 2. Then, the control section 12 of the battery pack 2 opens the first switch 14a and the second switch 14b first, and closes the third switch 14c after a time interval of T2. After this, the portable telephone 1 goes into the 'in the talk time' status.

As shown in FIG. 3, the first switch 14a, the second switch 14b, and the third switch 14c are all in open states during the time intervals T1 and T2. Therefore, transitional short of the first rechargeable battery cell 2a due to simultaneous close of the first switch 14a and the third switch 14c, and transitional short of the second rechargeable battery cell 2b due to simultaneous close of the second switch 14b and the third switch 14c, can be avoided.

However, during the time intervals T1 and T2, the rechargeable battery cells 2a and 2b form no closed circuit between the positive pole feeding terminal 3 and the negative pole feeding terminal 4, and thus no voltage is supplied between the feeding terminals 3 and 4. Therefore, the capacitor 11 of large capacitance is provided between the feeding terminals 3 and 4 in order to supply voltage which is necessary for the operation of the portable telephone 1 during the time intervals T1 and T2.

It is preferable that the switching of the connection status of the rechargeable battery cells 2a and 2b between parallel connection and series connection is executed when current drain of the portable telephone 1 is the smallest, for minimization, miniaturization, and weight reduction of the capacitor 11. Therefore, when the portable telephone 1 goes into the standby time, it is advantageous to switch the connection status of the rechargeable battery cells 2a and 2b from series connection to parallel connection after a talk is over as mentioned above referring to FIG. 3. And when the portable telephone 1 goes into the talk time, it is advantageous to switch the connection status of the rechargeable battery cells 2a and 2b from parallel connection to series connection before a talk begins as shown in FIG. 3.

In the case where the portable telephone 1 is a digital portable telephone provided with functions for executing time division communication such as TDMA (Time Division Multiple Access), the receiver section 5b can stop its operation during time slots which are not sent to the portable telephone 1 itself, and during which, the current needed by the portable telephone 1 is almost zero. Therefore, it is advantageous to execute the switching of the connection status of the rechargeable battery cells during such time slots, for further minimization, miniaturization, and weight reduction of the capacitor 11.

As mentioned above, the control section 12 of the battery pack 2 is connected with the positive pole feeding terminal 3 (the positive pole recharge terminal 15) and the negative pole feeding terminal 4 (the negative pole recharge terminal 16) as mentioned above, and continuously monitors the voltage between the feeding terminals 3 and 4 and the voltage between the recharge terminals 15 and 16.

Therefore, when voltage for recharging the rechargeable battery cells 2a and 2b (which is higher than voltage generated by the rechargeable battery cells 2a and 2b) is supplied to the recharge terminals 15 and 16 by the charger, the control section 12 detects the recharging voltage, and opens the first switch 14a and the second switch 14b, and closes the third switch 14c (the state 3 in Table 1).

By the switching, the rechargeable battery cells 2a and 2b are connected in series, and thus application of high voltage of the charger to each of the rechargeable battery cells is avoided, thereby the rechargeable battery cells 2a and 2b can be protected from overheating or ignition due to application of overvoltage. Further, recharge time can be saved by passing recharging current to the rechargeable battery cells 2a and 2b in series.

As described above, according to the first embodiment, the operating status of the portable telephone 1 is detected by the control section 7 and connection status of the rechargeable battery cells 2a and 2b is switched according to the operating status of the portable telephone 1, in which the rechargeable battery cells 2a and 2b are connected in series when the portable telephone 1 is in operating statuses which need high voltage (for example, during the talk time), and the rechargeable battery cells are connected in parallel when the portable telephone 1 is in operating statuses which do not need high voltage (for example, during the standby time). Therefore, voltage level needed by the portable telephone 1 can be supplied without waste of power consumption, and thereby the continuous use time of the portable telephone 1 can be extended.

Further, the switching of the connection status of the rechargeable battery cells 2a and 2b is executed by such appropriate procedure and timing that transitional shorts of the second rechargeable battery cells due to simultaneous close of the switches do not occur, thereby overheating or ignition due to short circuits can be prevented.

Further, the capacitor 11 is provided between the positive pole feeding terminal 3 and the negative pole feeding terminal 4 for supplying electric power to circuit blocks in the portable telephone 1 during the switching of the connection status of the rechargeable battery cells 2a and 2b, thereby interruption of the operation of the portable telephone 1 due to the switching can be avoided.

Further, the switching of the connection status of the rechargeable battery cells 2a and 2b is executed when current drain of the portable telephone 1 is small, that is, the switching from series connection to parallel connection is executed after a talk (i.e. conversation using the portable telephone 1) is over and the switching from parallel connection to series connection is executed before a talk is started, thereby minimization, miniaturization, and weight reduction of the capacitor 11 for supplying electric power during the switching can be realized.

Further, in the case where the portable telephone 1 is a digital portable telephone for executing time division communication such as TDMA, it is possible to further execute the minimization, miniaturization, and weight reduction of the capacitor 11 by executing the switching of the connection status of the rechargeable battery cells during time slots which are not sent to the portable telephone 1 itself.

Further, the rechargeable battery cells 2a and 2b are connected in series during recharge. Therefore, the rechargeable battery cells 2a and 2b can be protected from overheating or ignition due to overvoltage by avoiding application of high voltage of the charger to each of the rechargeable battery cells, and recharge time of the rechargeable battery cells can be saved.

Figure 4:
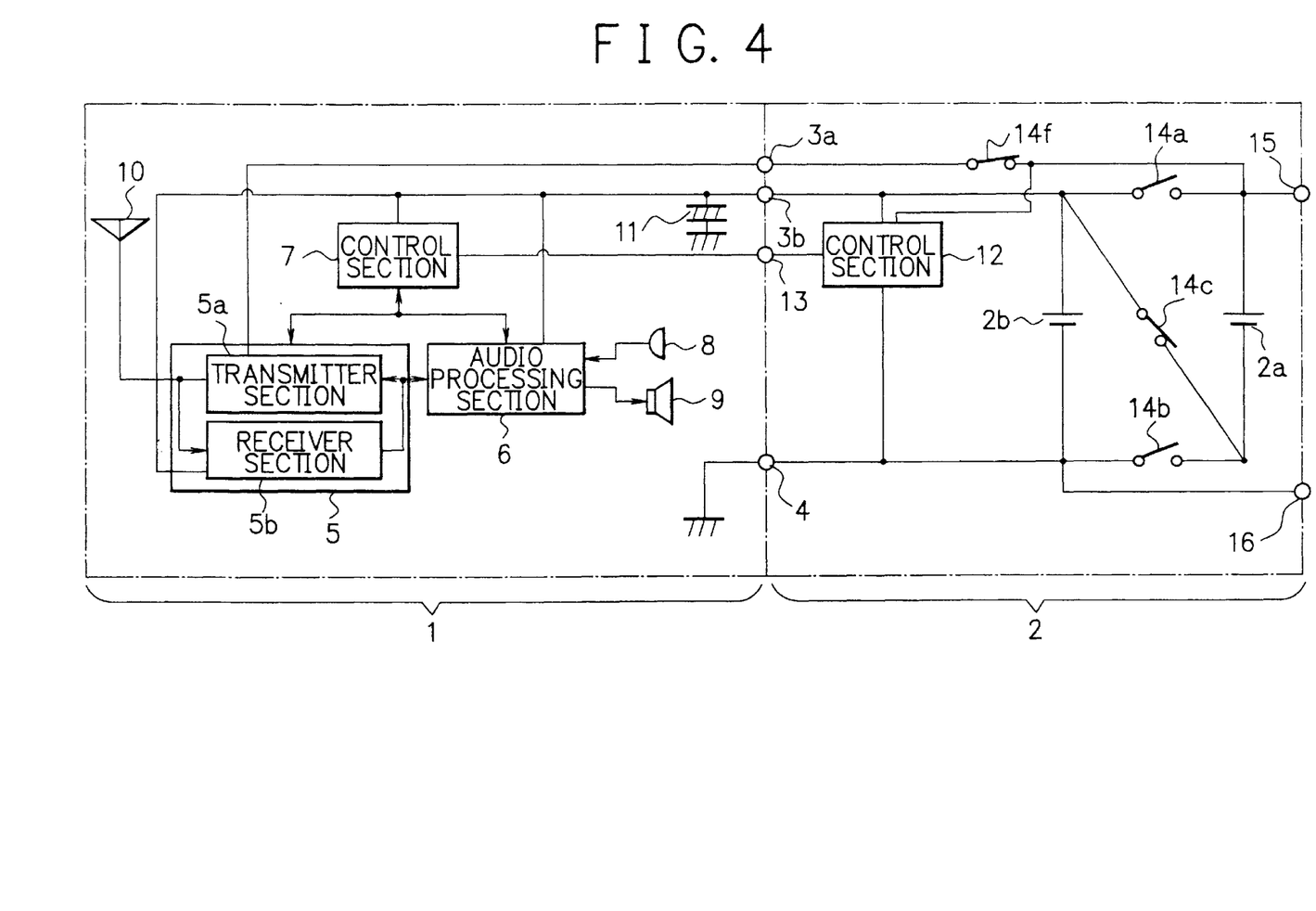
FIG. 4 is a block diagram showing the second embodiment of the present invention.

FIG. 4 is a block diagram showing the second embodiment of the present invention, in which a battery pack 2 according to the present invention is attached to a portable telephone 1. In FIG. 4, the same reference characters as those of FIG. 2 designate the same or corresponding parts to those of FIG. 2.

In the second embodiment of FIG. 4, the portable telephone 1 and the battery pack 2 are connected by a positive pole feeding terminal 3a for the transmitter section 5a, a positive pole feeding terminal 3b for other circuit blocks than the transmitter section 5a, and the negative pole feeding terminal 4, and the control signal terminal 13, differently from the first embodiment of FIG. 2. The battery pack 2 is provided with the first switch 14a, the second switch 14b, and the third switch 14c, similarly to the first embodiment, and is further provided with a sixth switch 14f.

In the following, the operation of the second embodiment will be described referring to FIG. 4 and Table 2.

TABLE 2

| | STATE 1<br>SERIES<br>CONNECTION | STATE 2<br>PARALLEL<br>CONNECTION | STATE 3<br>RECHARGE |
|---|---|---|---|
| FIRST<br>SWITCH 14a | OPEN | CLOSE | OPEN |
| SECOND<br>SWITCH 14b | OPEN | CLOSE | OPEN |
| THIRD<br>SWITCH 14c | CLOSE | OPEN | CLOSE |
| SIXTH<br>SWITCH 14f | CLOSE | OPEN | CLOSE |

When the operating status of the portable telephone 1 is 'in the talk time' or 'starting the talk time', each switch in the battery pack 2 is controlled by the control section 12 so that the rechargeable battery cells 2a and 2b will be connected in series (the state 1 in Table 2). On the other hand, when the operating status of the portable telephone 1 is 'in the standby time' or 'started the standby time', each switch in the battery pack 2 is controlled by the control section 12 so that the rechargeable battery cells 2a and 2b will be connected in parallel (the state 2 in Table 2).

When the rechargeable battery cells 2a and 2b are connected in series, the first switch 14a and the second switch 14b are in open states and the third switch 14c and the sixth switch are in close states, as shown in the state 1 in Table 2. Thus, the positive pole feeding terminal 3c for the transmitter section 5a is connected to the positive pole of the first rechargeable battery cell 2a, and the negative pole of the first rechargeable battery cell 2a is connected with the positive pole of the second rechargeable battery cell 2b via the third switch 14c, and the negative pole of the second rechargeable battery cell 2b is connected to the negative pole feeding terminal 4. Therefore, the sum of the voltages of the two rechargeable battery cells 2a and 2b is applied between the positive pole feeding terminal 3a and the negative pole feeding terminal 4, and the voltage is supplied to the transmitter section 5a. At this time, the other circuit blocks such as the receiver section 5b, the control section 7, etc. are connected to the second rechargeable battery cell 2b via the positive pole feeding terminal 3b for the other circuit blocks than the transmitter section 5a, and thus the voltage of the second rechargeable battery cell 2b only is supplied to them without power consumption of the first rechargeable battery cell 2a. Incidentally, the switches 14a, 14b, 14c and 14f in FIG. 4 are showing this state 1 of Table 2.

On the other hand, when the rechargeable battery cells 2a and 2b are connected in parallel, the first switch 14a and the second switch 14b are in close states and the third switch 14c and the sixth switch 14f are in open states, as shown in the state 2 in Table 2. Thus, the positive poles of the first rechargeable battery cell 2a and the second rechargeable battery cell 2b are connected together via the first switch 14a, and the negative poles of the first rechargeable battery cell 2a and the second rechargeable battery cell 2b are connected together via the second switch 14b. Thus, the positive pole feeding terminal 3b for the other circuit blocks is connected to the positive poles of the first rechargeable battery cell 2a and the second rechargeable battery cell 2b, and the negative pole feeding terminal 4 is connected to the negative poles of the first rechargeable battery cell 2a and the second rechargeable battery cell 2b. Therefore, the voltage of a piece of rechargeable battery cell is applied between the positive pole feeding terminal 3b and the negative pole feeding terminal 4, and the voltage is supplied to the other circuit blocks. At this time, no voltage is supplied between the positive pole feeding terminal 3a and the negative pole feeding terminal 4, and no voltage is supplied to the transmitter section 5a, since the sixth switch 14f is in an open state. Therefore, power consumption by the transmitter section 5a during the standby time is prevented.

Incidentally, although the portable telephone 1 is designed to be attached to the battery pack 2 including the rechargeable battery cells and the switches in the second embodiment, it is as well possible to design the portable telephone 1 to directly include the rechargeable battery cells and the switches using no battery pack. Further, it is as well possible to provide constant-voltage circuits between the positive pole feeding terminal 3b and circuit blocks.

As described above, according to the second embodiment, as well as the same effects as those of the first embodiment, the switches 14a, 14b, 14c and 14f are designed and switched to supply constant low voltage (i.e. the voltage level of a piece of rechargeable battery cell) to the other circuit blocks than the transmitter section 5a both during the talk time and the standby time, and to supply high voltage by series connection of the rechargeable battery cells 2a and 2b to the transmitter section 5a during the talk time only. Therefore, voltage level needed by each circuit block in the portable telephone 1 can be supplied without waste of power consumption, and thereby the continuous use time of the portable telephone 1 can be further effectively extended.

Figure 5:
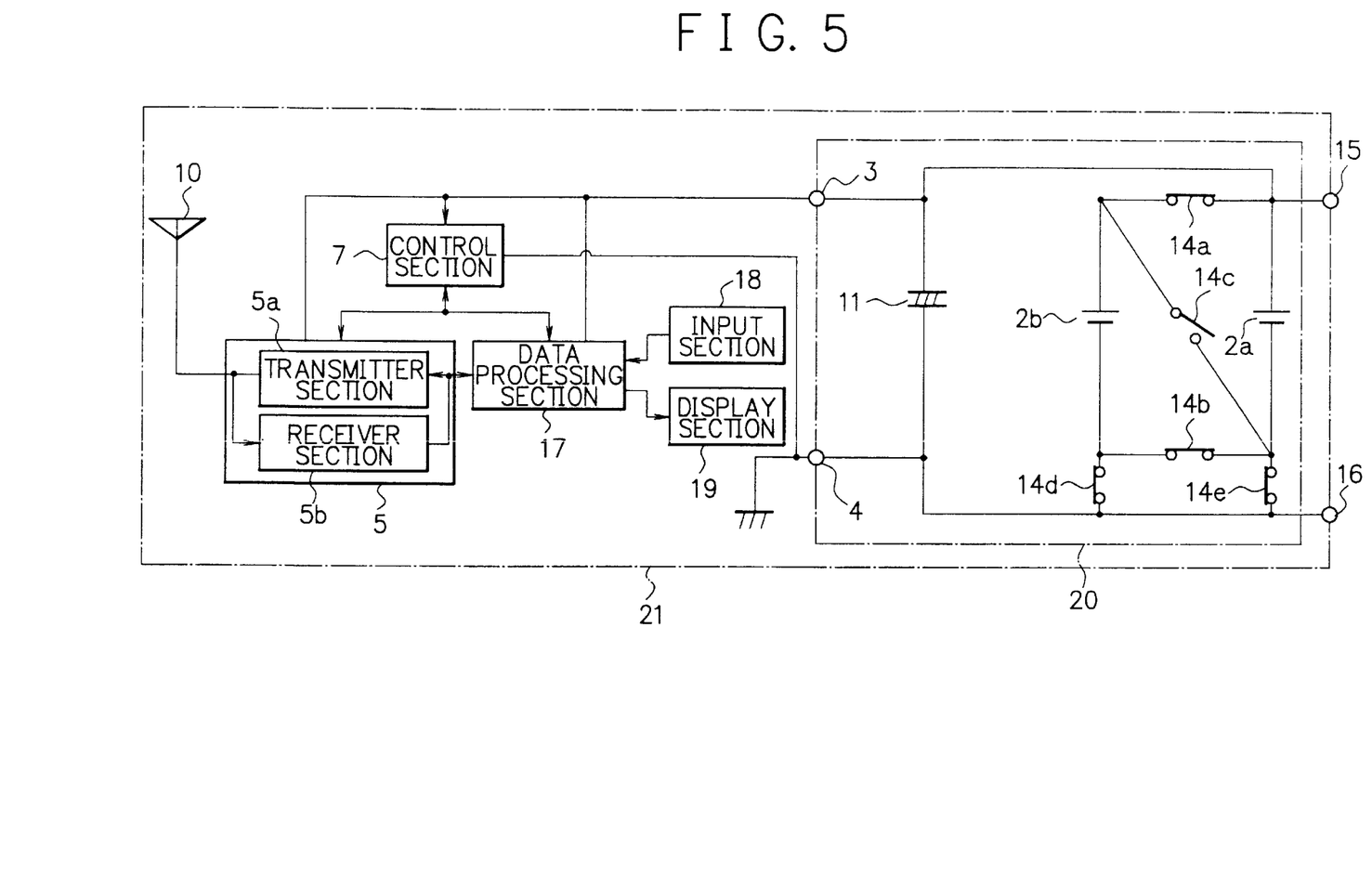
FIG. 5 is a block diagram showing the third embodiment of the present invention.

FIG. 5 is a block diagram showing the third embodiment of the present invention, in which a portable electronic device according to the present invention (a portable data communication device 21 for data communication) is including rechargeable battery cells and switches. In FIG. 5, the same reference characters as those of FIG. 2 designate the same or corresponding parts to those of FIG. 2.

The portable data communication device 21 of FIG. 5 comprises a radio section 5, a data processing section 17, a control section 7, an input section 18 such as a touch panel, a display section 19 such as an LCD (Liquid Crystal Display), an antenna 10, and a battery section 20.

The battery section 20 includes a first rechargeable battery cell 2a, a second rechargeable battery cell 2b, a first switch 14a, a second switch 14b, a third switch 14c, a fourth switch 14d, and a fifth switch 14e. The switches 14a–14e are placed to switch the connection status of the rechargeable battery cells 2a and 2b. Circuit blocks such as the radio section 5, the data processing section 17, the control section 7, etc. are connected to the rechargeable battery cells 2a and 2b, and each of them is grounded though unshown, that is, each of such circuit blocks is powered by the rechargeable battery cells 2a and 2b. The radio section 5 includes a transmitter section 5a provided with an output amplification circuit, and a receiver section 5b for receiving radio signals from radio base stations. A capacitor 11 of large capacitance is provided between the positive pole feeding terminal 3 and the negative pole feeding terminal 4 of the battery section 20. The portable data communication device 21 is further provided with a positive pole recharge terminal 15 and a negative pole recharge terminal 16 for connecting the rechargeable battery cells 2a, 2b and a charger. The recharge terminals 15 and 16 are connected with the feeding terminals 3 and 4 respectively.

The positive pole of the first rechargeable battery cell 2a is connected to the positive pole feeding terminal 3, and is connected with the positive pole of the second rechargeable battery cell 2b via the first switch 14a. The negative pole of the first rechargeable battery cell 2a is connected with the negative pole of the second rechargeable battery cell 2b via the second switch 14b, and is connected with the positive pole of the second rechargeable battery cell 2b via the third switch 14c, and is connected with the negative pole feeding terminal 4 via the fifth switch 14e. The negative pole of the second rechargeable battery cell 2b is connected to the negative pole feeding terminal 4 via the fourth switch 14d, and is connected with the negative pole of the first rechargeable battery cell 2a via the second switch 14b as mentioned above.

The control section 7 detects the operating status of the portable data communication device 21 (for example, communicating or not), and opens/closes the switches 14a, 14b, 14c, 14d and 14e according to the result of the detection. The control section 7 is also connected with the positive pole feeding terminal 3 (the positive pole recharge terminal 15) and the negative pole feeding terminal 4 (the negative pole recharge terminal 16), and monitors a supply voltage which is supplied to the circuit blocks and a recharge voltage which is supplied from the charger.

In the following, the operation of the third embodiment will be described referring to FIG. 5 and Table 3.

TABLE 3

|  | STATE 1 SERIES CONNECTION | STATE 2 PARALLEL CONNECTION | STATE 3 RECHARGE | STATE 4 OVERCHARGE AVOIDANCE | STATE 5 OVERDISCHARGE AVOIDANCE |
|---|---|---|---|---|---|
| FIRST SWITCH 14a | OPEN | CLOSE | OPEN | OPEN | OPEN/CLOSE |
| SECOND SWITCH 14b | OPEN | CLOSE | OPEN | OPEN | OPEN/CLOSE |
| THIRD SWITCH 14c | CLOSE | OPEN | CLOSE | CLOSE | CLOSE/OPEN |
| FOURTH SWITCH 14d | CLOSE | CLOSE | CLOSE | OPEN | OPEN |
| FIFTH SWITCH 14e | OPEN | CLOSE | OPEN | OPEN | OPEN |

When the operating status of the portable data communication device 21 is 'communicating' or 'starting communication', each switch in the battery section 20 is controlled by the control section 7 so that the rechargeable battery cells 2a and 2b will be connected in series, thereby voltage between the feeding terminals 3 and 4 is set high (the state 1 in Table 3). On the other hand, when the operating status of the portable data communication device 21 is 'no communication', each switch in the battery section 20 is controlled by the control section 7 so that the rechargeable battery cells 2a and 2b will be connected in parallel, thereby voltage between the feeding terminals 3 and 4 is set low (the state 2 in Table 3).

When the rechargeable battery cells 2a and 2b are connected in series, the first switch 14a, the second switch 14b and the fifth switch 14e are in open states, and the third switch 14c and the fourth switch 14d are in close states, as shown in the state 1 in Table 3. Thus, the positive pole feeding terminal 3 is connected to the positive pole of the first rechargeable battery cell 2a, and the negative pole of the first rechargeable battery cell 2a is connected with the positive pole of the second rechargeable battery cell 2b via the third switch 14c, and the negative pole of the second rechargeable battery cell 2b is connected to the negative pole feeding terminal 4. Therefore, the sum of the voltages of the two rechargeable battery cells 2a and 2b is applied between the positive pole feeding terminal 3 and the negative pole feeding terminal 4.

On the other hand, when the rechargeable battery cells 2a and 2b are connected in parallel, the first switch 14a, the second switch 14b, the fourth switch 14d and the fifth switch 14e are in close states, and the third switch 14c is in an open state, as shown in the state 2 in Table 3. Thus, the positive poles of the first rechargeable battery cell 2a and the second rechargeable battery cell 2b are connected together via the first switch 14a, and the negative poles of the first rechargeable battery cell 2a and the second rechargeable battery cell 2b are connected together via the second switch 14b. Thus, the positive pole feeding terminal 3 is connected to the positive poles of the first rechargeable battery cell 2a and the second rechargeable battery cell 2b, and the negative pole feeding terminal 4 is connected to the negative poles of the first rechargeable battery cell 2a and the second rechargeable battery cell 2b. Therefore, the rechargeable battery cells 2a and 2b are connected in parallel and the voltage of a piece of rechargeable battery cell is applied between the positive pole feeding terminal 3 and the negative pole feeding terminal 4. Incidentally, the switches 14a, 14b, 14c, 14e and 14e in FIG. 5 are showing this state 2 of Table 3.

In the third embodiment, the battery section 20 is provided with the fifth switch 14e as well as the fourth switch 14d for connecting the rechargeable battery cells 2a, 2b and the negative pole feeding terminal 4. Here, providing the fourth switch 14d only is enough for connecting the rechargeable battery cells and the negative pole feeding terminal 4. However, with the fourth switch 14d only, the first rechargeable battery cell 2a has to be connected to the negative pole feeding terminal 4 via two switches (i.e. the second switch 14b and the fourth switch 14d) with high resistance. Therefore, the fifth switch 14e is provided in order to reduce the resistance between the rechargeable battery cells (especially, the first rechargeable battery cell 2a) and the negative pole feeding terminal 4.

Incidentally, although the portable data communication device 21 was designed to directly include the rechargeable battery cells and the switches using no battery pack in this embodiment, it is as well possible to design the portable data communication device 21 to be attached to a battery pack including the rechargeable battery cells and the switches.

Further, although no constant-voltage circuit was provided between the positive pole feeding terminal 3 and each circuit block in this embodiment, it is as well possible to provide constant-voltage circuits between the positive pole feeding terminal 3 and the circuit blocks, and let the control section 7 switch the output voltages of some of the constant-voltage circuits according to the control of the switches 14a, 14b, 14c, 14d and 14e.

Figure 6:
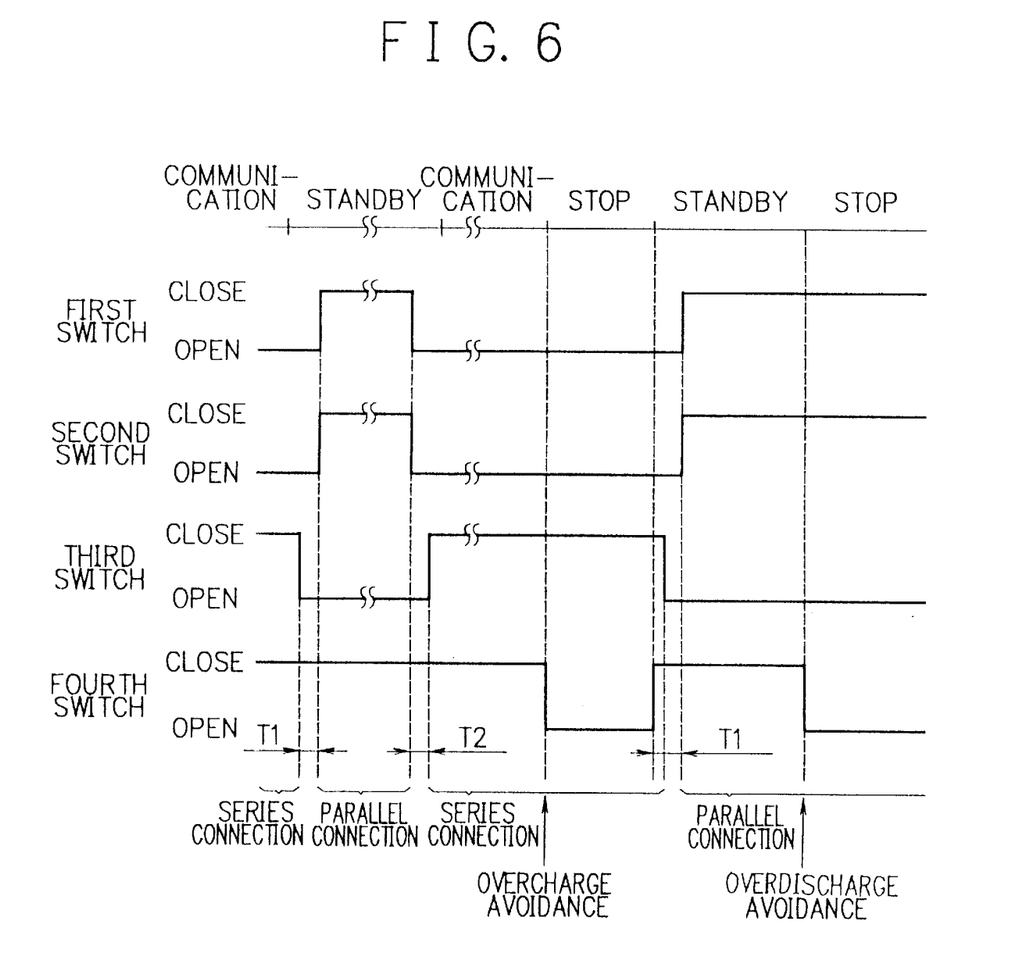
FIG. 6 is a timing chart showing the operation of switches of a battery pack in the embodiment of FIG. 5.

FIG. 6 is a timing chart showing the switching of the switches 14a, 14b and 14c in the battery pack 2. The operation of the first to the third switches 14a–14c is basically the same as the operation of those of the first embodiment shown in FIG. 3. When communication of the portable data communication device 21 is over and a standby starts, the connection status of the rechargeable battery cells 2a and 2b is switched from series connection to parallel connection. The control section 7 opens the third switch 14c first, and closes the first switch 14a and the second switch 14b after a time interval of T1.

On the other hand, when the standby ends and communication starts, the connection status of the rechargeable battery cells 2a and 2b is switched from parallel connection to series connection. The control section 7 opens the first switch 14a and the second switch 14b first, and closes the third switch 14c after a time interval of T2. After this, the portable data communication device 21 starts communication.

As shown in FIG. 6, the first switch 14a, the second switch 14b, and the third switch 14c are all in open states during the time intervals T1 and T2. Therefore, transitional short of the first rechargeable battery cell 2a due to simultaneous close of the first switch 14a and the third switch 14c, and transitional short of the second rechargeable battery cell 2b due to simultaneous close of the second switch 14b and the third switch 14c, can be avoided. However, during the time intervals T1 and T2, the rechargeable battery cells 2a and 2b form no closed circuit between the feeding terminals 3 and 4, and thus no voltage is supplied between the feeding terminals 3 and 4. Therefore, the capacitor 11 of large capacitance is provided between the feeding terminals 3 and 4 in order to supply voltage which is necessary for the operation of the portable data communication device 21 during the time intervals T1 and T2.

It is preferable that the switching of the connection status of the rechargeable battery cells 2a and 2b between parallel connection and series connection is executed when current drain of the portable data communication device 21 is the smallest, for minimization, miniaturization, and weight reduction of the capacitor 11. Therefore, when the portable data communication device 21 finishes communication and goes into a standby, it is advantageous to switch the connection status of the rechargeable battery cells 2a and 2b from series connection to parallel connection after the communication is over as mentioned above referring to FIG. 6. And when the portable data communication device 21 goes into communication, it is advantageous to switch the connection status of the rechargeable battery cells 2a and 2b from parallel connection to series connection before the communication starts as shown in FIG. 6.

Further, in the case where the portable data communication device 21 is a digital portable data communication device provided with functions for executing time division communication such as TDMA, the receiver section 5b can stop its operation during time slots which are not sent to the portable data communication device 21 itself, and during which, the current needed by the portable data communication device 21 is almost zero. Therefore, it is advantageous to execute the switching of the connection status of the rechargeable battery cells during such time slots, for further minimization, miniaturization, and weight reduction of the capacitor 11.

The operation of the first to the third switches 14a-14c for recharging the rechargeable battery cells 2a and 2b is also basically the same as the operation of those of the first embodiment shown in FIG. 3. The control section 7 of the portable data communication device 21 is connected with the positive pole feeding terminal 3 (the positive pole recharge terminal 15) and the negative pole feeding terminal 4 (the negative pole recharge terminal 16), and continuously monitors the voltage between the feeding terminals 3 and 4 and the voltage between the recharge terminals 15 and 16.

When voltage for recharging the rechargeable battery cells 2a and 2b (which is higher than voltage generated by the rechargeable battery cells 2a and 2b) is supplied to the recharge terminals 15 and 16 by the charger, the control section 7 detects the recharging voltage, and opens the first switch 14a and the second switch 14b, and closes the third switch 14c in the same way as the first embodiment, and closes the fourth switch 14d and opens the fifth switch 14e (the state 3 in Table 3). By the switching, the rechargeable battery cells 2a and 2b are connected in series, and thus application of high voltage of the charger to each of the rechargeable battery cells is avoided, thereby the rechargeable battery cells 2a and 2b in the portable data communication device 21 can be protected from overheating or ignition due to application of overvoltage. Further, recharge time can be saved by passing recharging current to the rechargeable battery cells 2a and 2b in series.

In the following, the operation of the fourth switch 14d which is characteristic of the third embodiment will be described.

During recharge of the rechargeable battery cells 2*a* and 2*b*, in the case where the recharge voltage applied between the recharge terminals 15 and 16 by the charger becomes higher than a predetermined voltage level, the control section 7 detects the abnormal condition and opens the closed fourth switch 14*d* for opening the recharge circuit, thereby the rechargeable battery cells 2*a* and 2*b* can be protected from overheating or ignition due to overvoltage (the state 4 in Table 3).

On the other hand, during discharge of the rechargeable battery cells 2*a* and 2*b* (i.e. in use of the portable data communication device 21 other than recharge), in the case where the supply voltage applied between the feeding terminals 3 and 4 by the rechargeable battery cells 2*a* and 2*b* becomes lower than a predetermined voltage level, the control section 7 detects the abnormal condition and opens the closed fourth switch 14*d* for opening the discharge circuit, thereby the rechargeable battery cells 2*a* and 2*b* can be protected from deterioration of characteristics due to overdischarge (the state 5 in Table 3).

As described above, according to the third embodiment, the same effects as those of the first embodiment can be obtained in portable electronic devices which directly include rechargeable battery cells using no battery packs.

Further, overheating, ignition, etc. of the rechargeable battery cells 2*a* and 2*b* due to overvoltage can be avoided by opening the fourth switch 14*d* and opening the recharge circuit when the recharge voltage level becomes higher than the predetermined voltage level during recharge.

Further, deterioration of characteristics of the rechargeable battery cells 2*a* and 2*b* due to overdischarge can be prevented by opening the fourth switch 14*d* and opening the discharge circuit when the supply voltage level becomes lower than the predetermined voltage level during use of the portable data communication device 21.

Incidentally, although two rechargeable battery cells (the rechargeable battery cells 2*a* and 2*b*) were contained in the battery pack or the portable electronic device in the above embodiments, the number of the rechargeable battery cells is not limited to two, and it is as well possible to design the battery pack or the portable electronic device to contain three or more rechargeable battery cells and switch the connection status of the cells between parallel connection and series connection for reducing power consumption and extending the continuous use time lengths of electronic devices.

Further, although rechargeable battery cells were contained in the battery pack or the portable electronic device in the above embodiments, the type of the cells is not limited to rechargeable cells, and it is of course possible to reduce power consumption by switching the connection status of the cells between parallel connection and series connection. In the case where cells other than rechargeable cells are used, the composition and the operation of the battery pack or the portable electronic device in the above embodiments concerning recharge are not necessary.

As set forth hereinabove, by the battery pack and the portable electronic device according to the present invention, connection status of cells is switched between parallel connection and series connection according to the operating status of the electronic device containing the cells, thereby power consumption is effectively reduced, and remarkable extension of the continuous use time length of the electronic device is realized.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A battery pack containing at least a first cell and a second cell, comprising:

a first wire for connecting the positive pole of the first cell and the positive pole of the second cell;

a second wire for connecting the negative pole of the first cell and the negative pole of the second cell;

a third wire for connecting the negative pole of the first cell and the positive pole of the second cell;

a first switch for connecting, disconnecting said first wire;

a second switch for connecting, disconnecting said second wire;

a third switch for connecting. disconnecting said third wire; and means, automatically responsive to respective ones of a plurality of operating states of a device powered by said battery park, one of said operating states being preferably operated at a voltage different from a voltage at which another of said operating states is preferably operated, for controlling the first switch, the second switch and the third switch to switch the connection status of the first cell and the second cell between parallel connection and series connection;

a control means for controlling the connection status of the cells according to a control signal which is sent from a portable communication device, including a transmitter section and circuits other than the transmitter section, to which the battery pack is attached;

a first positive pole feeding terminal for supplying voltage to a transmitter section of the portable communication device;

a second positive pole feeding terminal for supplying voltage to circuit blocks of the portable communication device other than the transmitter section;

a sixth wire for connecting the first positive pole feeding terminal and the positive pole of the first cell;

a sixth switch for connecting/disconnecting the sixth wire; and a seventh wire for connecting the second positive pole feeding terminal and the positive pole of the second cell and supplying voltage to the circuit blocks other than the transmitter section constantly, wherein:

the control means sets the connection status of the cells in a first status in which the first switch and the second switch are in open states and the third switch and the sixth switch are in close states so that the first cell and the second cell will be connected in series and the transmitter section will be supplied with voltage by the series connection of the first cell and the second cell, when the control signal represents an operating status of the portable communication device in which communication by the transmitter section is needed to be executed, and the control means sets the connection status of the cells in a second status in which the first switch and the second switch are in close states and the third switch and the sixth switch are in open states so that the first cell and the second cell will be connected in parallel and the transmitter section will not be supplied with voltage by the first cell and the second cell, when the control signal represents an operating status of the portable communication device in which communication by the transmitter section is not needed to be executed.

2. A battery pack, containing at least a first cell and a second cell, comprising:

a first wire for connecting the positive pole of the first cell and the positive pole of the second cell;

a second wire for connecting the negative pole of the first cell and the negative pole of the second cell;

a third wire for connecting the negative pole of the first cell and the positive pole of the second cell;

a first switch for connecting, disconnecting said first wire;

a second switch for connecting, disconnecting said second wire;

a third switch for connecting, disconnecting said third wire; and means, automatically responsive to respective ones of a plurality of operating states of a device powered by said battery park, one of said operating states being preferably operated at a voltage different from a voltage at which another of said operating states is preferably operated, for controlling the first switch, the second switch and the third switch to switch the connection status of the first cell and the second cell between parallel connection and series connection; and a control means for controlling the connection status of the cells according to a control signal which is sent form a portable communication device to which the battery pack is attached, wherein:

the control means sets the connection status of the cells in a first status in which the first switch and the second switch are in open states and the third switch is in a close state so that the first cell and the second cell will be connected in series, when the control signal represents an operating status of the portable communication device in which communication is needed to be executed, and the control means sets the connection status of the calls in a second status in which the first switch and the second switch are in close states and the third switch is in an open state so that the first cell and the second cell will be connected in parallel, when the control signal represents an operating status of the portable communication device in which communication is not needed to be executed, and wherein the first switch and the second switch are switched from open states to close states after the third switch is switched from a close state to an open state, when the connection status of the cells is switched form series connection to parallel connection, and the third switch is switched form an open state to a close state after the first switch and the second switch are switched from close states to open states, when the connection status of the cells is switched from parallel connection to series connection, the battery pack further comprising a capacitor for storing electric charge supplied from the first and the second cells and preventing interruption of voltage supply to the portable communication device during the switching of the connection status of the first and the second cells between parallel connection and series connection.

3. A battery pack as claimed in claim 2, wherein:

the control signal includes a communication start signal which represents a status in which the portable communication device is going to start communication, and a standby signal which represents a status in which the portable communication device is in the standby time, and the control means switches the connection status of the cells to the first status before the communication is started, according to the communication start signal, and switches the connection status of the cells to the second status after the communication is stopped, according to the standby signal.

4. A battery pack as claimed in claim 3, wherein the switching of the connection status of the cells by the control means is executed during time slots which are not sent to the portable communication device in the case where the portable communication device to which the battery pack is attached is a device which executes time division communication.

5. A portable electronic device containing a plurality of cells comprising a plurality of switches for switching connection status of the cells between parallel connection and series connection, comprising:

a first wire for connecting the positive pole of the first cell and the positive pole of the second cell;

a second wire for connecting the negative pole of the first cell and the negative pole of the second cell;

a third wire for connecting the negative pole of the first cell and the positive pole of the second cell;

a first switch for connecting, disconnecting the first wire;

a second switch for connecting, disconnecting the second wire; and a third switch for connecting, disconnecting the third wire;

a transmitter section for executing transmission;

a control means for controlling the connection status of the cells according to a control signal which is generated for representing the operating status of the portable electronic device;

a first positive pole feeding terminal for supplying voltage to the transmitter section;

a second positive pole feeding terminal for supplying voltage to circuit blocks of the portable electronic device other than the transmitter section;

a sixth wire for connecting the first positive pole feeding terminal and the positive pole of the first cell;

a sixth for connecting/disconnecting the sixth wire; and a seventh wire for connecting the second positive pole feeding terminal and the positive pole of the second cell and supplying voltage to the circuit blocks other than the transmitter section constantly, wherein:

the control means sets the connection status of the cells in a first status in which the first switch and the second switch are in open states and the third switch and the sixth switch are in close states so that the first cell and the second cell will be connected in series and the transmitter section will be supplied with voltage by the series connection of the first cell and the second cell, when the control signal represents an operating status in which communication by the transmitter section is needed to be executed, and the control means sets the connection status of the cells in a second status in which the first switch and the second switch are in close states and the third switch and the sixth switch are in open states so that the first cell and the second cell will be connected in parallel and the transmitter section will not be supplied with voltage by the first cell and the second cell, when the control signal represents and operating status in which communication by the transmitter section is not needed to be executed.

6. A portable electronic device containing a plurality of cells comprising a plurality of switches for switching connection status of the cells between parallel connection and series connection, comprising:

a first wire for connecting the positive pole of the first cell and the positive pole of the second cell;

a second wire for connecting the negative pole of the first cell and the negative pole of the second cell;

a third wire for connecting the negative pole of the first cell and the positive pole of the second cell;

a first switch for connecting, disconnecting the first wire;

a second switch for connecting, disconnecting the second wire; and a third switch for connecting, disconnecting the third wire;

a transmitter section for executing transmission; and a control means for controlling the connection status of the cells according to a control signal which is generated for representing the operating status of the portable electronic device, wherein:

the control means sets the connection status of the cells in a first status in which the first switch and the second switch are in open states and the third switch is in a close state so that the first cell and the second cell will be connected in series, when the control signal represents an operating status in which communication by the transmitter section is needed to be executed, and the control means sets the connection status of the cells in a second status in which the first switch and the second switch are in close states and the third switch is in an open state so that the first cell and the second cell will be connected in parallel, when the control signal represents an operating status in which communication by the transmitter section is not needed to be executed, and, wherein:

the first switch and the second switch are switched from open states to close states after the third switch is switched from a close state to an open state, when the connection status of the cells is switched from series connection to parallel connection, and the third switch is switched from an open state to a close state after the first switch and the second switch are switched from close states to open states, when the connection status of the cells is switched from parallel connection to series connection, the portable electronic device further comprising a capacitor for storing electric charge supplied from first and the second cells and preventing interruption of voltage supply during the switching of the connection status of the first and the second cells between parallel connection and series connection.

7. A portable electronic device as claimed in claim 6, wherein:

the control signal includes a communication start signal which represents a status in which the portable electronic device is going to start communication, and a standby signal which represents a status in which the portable electronic device is in the standby time, and the control means switches the connection status of the cells to the first status before the communication is started, according to the communication start signal, and switches the connection status of the cells to the second status after the communication is stopped, according to the standby signal.

8. A portable electronic device as claimed in claim 7, wherein the portable electronic device is a portable communication device which executes time division communication, and the switching of the connection status of the cells by the control means is executed during time slots which are not sent to the portable electronic device itself.

* * * * *